United States Patent [19]

Takase et al.

[11] Patent Number: 4,941,730
[45] Date of Patent: Jul. 17, 1990

[54] PLASTIC OPTICAL TRANSMITTABLE FIBERS

[75] Inventors: Minoru Takase; Naoya Ueno; Toshimi Arashi, all of Chiba, Japan

[73] Assignee: Idemitsu Petrochemical Company Limited, Tokyo, Japan

[21] Appl. No.: 193,609

[22] Filed: May 13, 1988

[30] Foreign Application Priority Data

May 15, 1987 [JP] Japan ................ 62-118192

[51] Int. Cl.⁵ ............... G02B 1/04; G02B 6/02
[52] U.S. Cl. .................. 350/96.34; 350/96.30
[58] Field of Search .......... 350/96.29, 96.30, 96.31, 350/96.32, 96.33, 96.34; 526/169.2, 281

[56] References Cited

U.S. PATENT DOCUMENTS

| | | | |
|---|---|---|---|
| 4,614,778 | 9/1986 | Kajiura et al. | 526/281 |
| 4,681,400 | 7/1987 | Ueba et al. | 350/96.34 |
| 4,762,392 | 8/1988 | Yamamoto et al. | 350/96.30 |

FOREIGN PATENT DOCUMENTS

| | | |
|---|---|---|
| 54-139987 | 10/1979 | Japan . |
| 57-179805 | 11/1982 | Japan . |
| 59-216105 | 12/1984 | Japan . |
| 61-58722 | 3/1986 | Japan . |
| 61-113604 | 5/1986 | Japan . |
| 61-210303 | 9/1986 | Japan . |
| 62-118307 | 5/1987 | Japan . |

*Primary Examiner*—John D. Lee
*Attorney, Agent, or Firm*—Armstrong, Nikaido, Marmelstein, Kubovcik & Murray

[57] ABSTRACT

A plastic optical transmittable fiber having improved optical transmission loss and flexibility and good heat resistance. The fiber comprises a cladding of a copolymer comprising 70 to 99.5 mole % of 4-methyl pentene-1 units and 30 to 0.5 mole % of units of an α-olefin of 2-24 carbon atoms, the refractive index of the core being higher than that of the cladding by at least 0.01.

6 Claims, 1 Drawing Sheet

PLASTIC OPTICAL TRANSMITTABLE FIBERS

FIELD OF THE INVENTION

The invention relates to plastic optical transmittable fibers which are suitable as fibers for optical transmission to be used for an optical sensor and optical communications, and excellent in heat resistance. In addition, the fibers have improved optical transmission loss and flexibility.

CONVENTIONAL TECHNOLOGY

In recent years, optical communication technologies have made rapid progress applying optical fibers as an information transmitting circuit and are now being practised in various industrial fields.

The optical fibers for optical transmission are classified into two categories, namely, an optical fiber of an inorganic glass system such as quartz which has been broadly used so far, and an optical transmittable fiber made of certain forms of plastic. The latter plastic optical fiber is strong, easy to handle, and low-priced compared with an inorganic optical fiber of an inorganic glass system. Therefore, this type of fiber has been actively developed for communications between short distances and has already been put to practical use.

For the plastic optical transmittable fibers, transparent thermoplastic resins are used as excellent chemical materials. The fiber forms a homocentric configuration to increase the refractive index of the core relative to that of the cladding. The incident ray emerging at one end is transmitted to the other end continuing the total reflection at the boundary between the core and cladding.

As for the core layer of such plastic optical transmittable fibers, examples of thermoplastic materials are: polycarbonate, polystyrene, polymethyl-methacrylate, a copolymer of methyl methacrylate and maleic anhydride or styrene; a copolymer of methyl methacrylate and isobornyl methacrylate or bornyl methacrylate. Judging from the excellent heat resistance and mechanical strength, polycarbonate is preferable.

While, for the layer of cladding, when using polycarbonate resin for the core, for example, polymethyl methacrylate(Japanese Patent Unexamined Publication(Kokai) No. 210303/1986), a copolymer formed from monomers such as methyl methacrylate, maleic anhydride, styrene, α-methyl styrene and so forth (Japanese Patent Unexamined Publication(Kokai) No. 216105/1984), and poly-4-methyl pentene-1(Japanese Patent Unexamined Publication(Kokai) No. 210303/1986) are proposed.

However, optical transmittable fibers using polymethyl methacrylate and a copolymer of said methyl methacrylate system for the cladding are not only unsatisfactory in heat resistance and are difficult to use under high temperature. Also, poly-4-methyl pentene-1 is satisfactory in heat resistance. But it is so inferior in transparency that the optical transmittable fiber having the cladding made of it has a great optical transmission loss. Furthermore, it is so high in flexural modulus that the optical transmittable fiber having the cladding made of it has lower flexibility.

SUMMARY OF THE INVENTION

Figure 1:
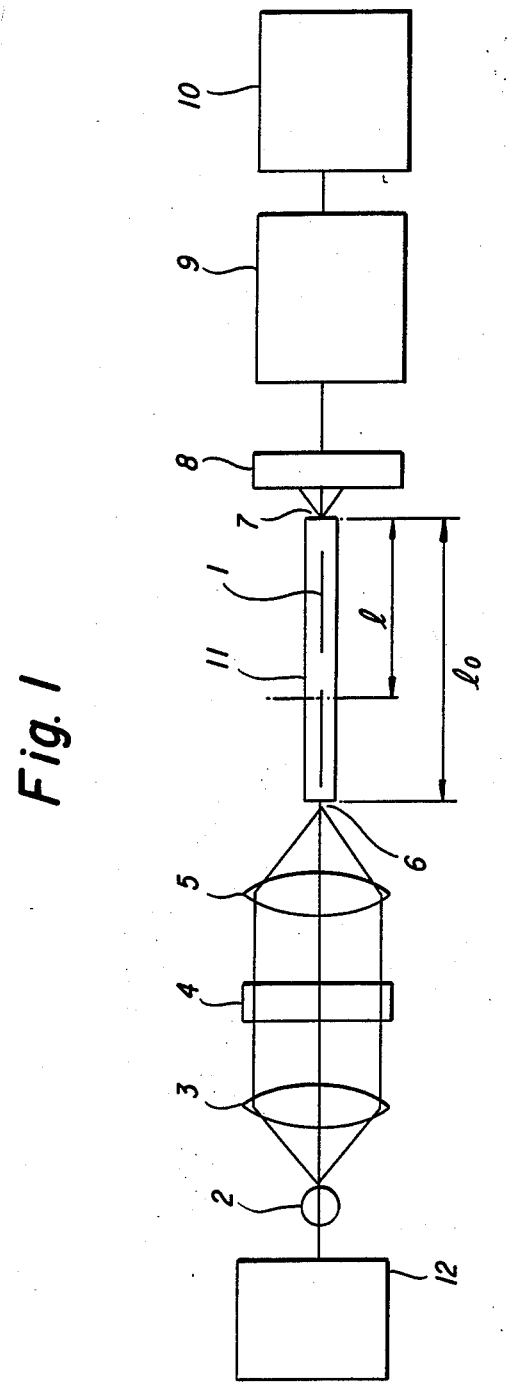
FIG. 1 shows a schematic drawing of the apparatus for measuring the optical transmission loss of optical transmittable fiber.

The invention has minimized the conventional disadvantages of cladding advanced plastic optical transmittable fibers having improved optical transmission loss, flexibility and better heat resistance.

The inventors have made progress in their studies for developing a plastic optical transmittable fiber with favorable properties. 4-methyl pentene-1 and other α-olefina having particular number of carbon atoms were co-polymerized in a desired ratio. As a result, the above-mentioned copolymer containing 4-methyl pentene-1 as a monomer unit was found to be excellent in transparency and flexibility compared with homopolymer of the 4-methyl pentene-1. The inventors paid attention to the fact that a plastic optical transmittable fiber has satisfactory heat resistance corresponding to said homopolymer and discovered the possibility of accomplishing the objects by using the copolymer as materials for the cladding layer. Consequently, the invention has been completed based on this information obtained from the study as mentioned above.

Namely, the invention provides plastic optical transmittable fiber in which the cladding consists of a copolymer composed of 70 to 99.5 mole % of the 4-methyl pentene-1 units and 30 to 0.5 mole % of units of an α-olefin of between 2 and 24 carbon atoms, and the refractive index of the core being 0.01 greater than that of the cladding.

DETAILED DESCRIPTION OF PREFERRED EMBODIMENTS OF INVENTION

The plastic optical transmittable fiber of the invention comprises the basic structural units of a core and cladding.

A copolymer of other 4-methyl pentene-1 and other α-olefin of 2 to 24 carbon atoms is used as a material of the cladding.

This copolymer must constitute 70 to 99.5 mole % of the 4-methyl pentene-1 units and 30 to 0.5 mole % of the other α-olefin units of 2 to 24 carbon atoms.

When the amount of said α-olefin units is less than 0.5 mole % in the copolymer, the transparency is not satisfactory. Therefore, even if this copolymer is used for the cladding, the optical transmission loss cannot be improved. When the amount of said α-olefin units is more than 30 mole % in the copolymer, the heat resistance of the copolymer is impaired. Therefore, the optical transmittable fiber using this copolymer for the cladding is inferior in heat resistance.

As for the α-olefin of 2 to 24 carbon atoms, examples are ethylene, propylene, 1-butene, 1-pentene, 1-hexene, 1-octene, 1-decene, 1-dodecene, 1-tetradecene, 1-hexadecene, 1-octadecene, 1-eicosene and so forth.

As for the α-olefin one species may be used or more than two species may be combined.

A preferred α-olefin is at least one of hexene-1, octene-1, and decene-1.

Said copolymers for the cladding of the plastic optical transmittable fiber in this invention can be formed according to known methods (Japanese Patent Examined Publication No. 22077/1975, Japanese Patent Unexamined Publication(Kokai) Nos. 139987/1979 and 113604/ 1986). For example, in the presence of a polymerization catalyst and in the appropriate solvent, the prescribed amount of 4-methyl pentene-1 and other α-olefin of 2 to 24 carbon atoms are copolymerized in a slurry in a temperature range of 20 to 100° C., preferably 30 to 80° C. Thus, the method of producing said copolymer is adopted.

In this case, as the polymerization catalyst a stereospecific catalyst such as the Ziegler system catalyst or the Natta system catalyst is preferable. For example, a combination of titanium catalyst and organoaluminum compound constituents and a further combination of an organosilicon compound are given preferably. Among these catalysts, a combination of titanium catalyst and organoaluminum compound constituents is preferred for the polymerization catalyst.

As for said catalytic constituents of titanium, for example, titanium trichloride; active titanium trichloride obtained by reducing titanium tetrachloride with one of hydrogen, aluminum, titanium and an organoaluminum compound; a complex containing at least titanium, magnesium, and halogen such as titanium halide supported on a carrier of a magnesium compound containing halogen; and a complex containing titanium, magnesium, halogen and diester as essential constituents.

Among these catalytic constituents, the titanium trichloride is preferable.

While, as the organoaluminum compound, for example, trialkyl aluminum, dialkyl aluminum halide, alkyl aluminum sesquihalide, dialkyl aluminum hydride with an alkyl group of 1 to 10 carbon atoms can be used. As for said halogen of halide, chlorine, bromine, and iodine are illustrated.

In this group, dialkyl aluminum halide is preferred, particularly, diethyl aluminumchloride.

Also, as the organosilicon compound, trimethyl methoxysilane, trimethyl ethoxysilane, trimethyl-n-propoxysilane, triethyl methoxysilane, tri-n-propyl methoxysilane, and tri-iso-propyl methoxysilane as trialkyl alkoxysilane, and triphenyl methoxysilane as triaryl alkoxysilane are examples.

As for said solvent, an inactive hydrocarbon, for example, butane, pentane, hexane, heptane, octane, decane, dodecane, and kerosene as an aliphatic hydrocarbon, cyclopentane, cyclohexane and so forth as an alicyclic hydrocarbon are preferred.

The polymerization reaction is preferably carried out in the presence of an inactive gas such as nitrogen and argon. Also, the reaction may be carried out at atmospheric pressure or under a pressurized state.

In addition, in the solvent of said inactive hydrocarbon, 4-methyl pentene-1 and/or a part of the α-olefin of 2 to 24 carbon atoms is prepolymerized by contacting with said catalyst for preliminary polymerization under the appropriate conditions and then consequently polymerized.

Thus, the refractive index of the copolymer of 4-methyl pentene-1 used in this invention is normally less than 1.50 and the melting point(Tm) is in the range of 200 to 250° C. This copolymer is not only excellent in transparency and flexibility compared with the poly-4-methyl pentene-1, but has a heat resistance corresponding to said homopolymer. Therefore, when employing the copolymer for the cladding, a plastic optical transmittable fiber improved in optical transmission loss and flexibility and having excellent heat resistance can be obtained.

While, concerning materials to be used for the core in the plastic optical transmittable fiber of the invention, there is no limitation as long as the refractive index of the core is 0.01 or more than that of said cladding and the polymer is excellent in transparency.

When the difference between the refractive index of said core and that of said cladding is less than 0.01, the optical transmittable fiber will not have a small optical transmission loss.

As for the polymer constituting said core, for example, polycarbonate, polystyrene, polymethyl methacrylate and so forth can be employed and polycarbonate polymer is preferable.

Said polycarbonate is represented by the general formula:

and —R—X—R— is, for example, an alicyclic group such as:

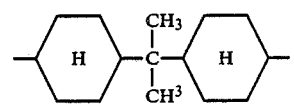

and

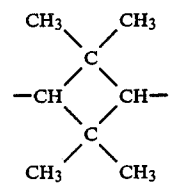

and an aromatic group such as:

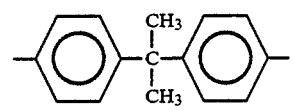

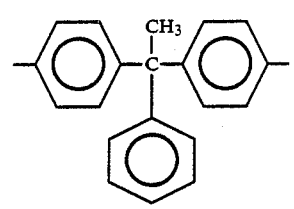

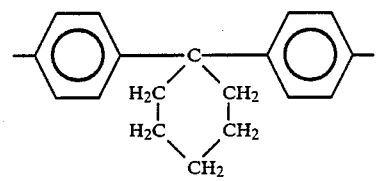

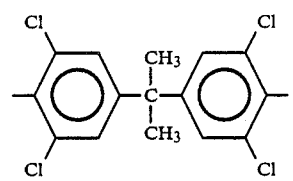

and

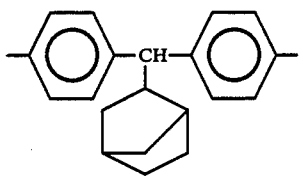

and the like

Also, copolymers with dihydroxy compounds such as 4,4'-dihydroxydiphenylether, ethylene glycol, p-xylene glycol, 1,6-hexanedial and the like, hetero-polymers having ester bonding in addition to carbonate bonding and heat resistant polycarbonate in which X in said formula(1) is a sulfonic group or a carbonyl group can be employed.

Of these polycarbonates, an aromatic polycarbonate obtained from bisphenol A and having a unit represented by the formula(II) is particularly preferred.

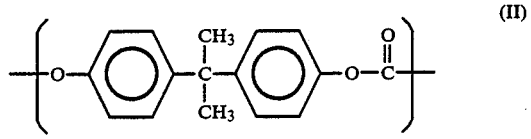

To produce satisfactorily the plastic optical transmittable fiber of the invention, for example, the following process may be adopted. As a co-spinning process, in a clean environmental state, the 4-methyl pentene-1 copolymer constituting said cladding and the polymer constituting said core are extruded in the molten state to form the structures of core and cladding. Also, a process combining spinning and coating processes may be employed, but the co-spinning process is advantageous from a point of view of simplicity.

The thickness of layer of cladding is normally 2 to several 10 μm, preferably 5 to 20 μm. The external surface of the plastic optical transmittable fibers may be coated to provide additional heat resistance and strength by using heat resistant coating materials, if desired.

As for the heat resistant coating materials, for example, polyethylene, crosslinked polyethylene, polyacetal, polyvinylidenefluoride, polycarbonate or polyaide such as 6-nylon and 6,6-nylon can be employed. Even if such heat resistant coating materials are used, the optical transmission loss is not affected.

For the plastic optical transmittable fibers of the invention, a 4-methylpentene-1 copolymer of a particular composition is used for the cladding and the optical transmission loss is small and the flexibility and heat resistance are so excellent that the particular sheath core fibers are suitable for optical transmission fibers to be used for an optical sensor and communications and can be used under an environment at high temperature.

Specific embodiments of the invention are described hereunder but the invention shall not be restricted by those embodiments.

In the following description the optical transmission loss has been measured according to the system illustrated in FIG. 1. Power from a power source (12) is supplied to a halogen lamp (2). The light produced by the halogen lamp (2) is converted to monochromatic by an interference filter(4) after being changed to parallel rays by lens (3) and is focused on lens(5) with the same numerical aperture as the optical transmittable fiber(1). The light is transmitted in the direction of incidence upon the optical transmittable fiber(1) by accommodating and positioning the plane of incidence(6) of the optical transmittable fiber to this focal point. The light which is incident from the plane of incidence(6) exits from the exit plane(7). The exit light is converted to a current with its intensity by photodiode(8) with a fully wide area and read as a voltage value by voltmeter(10) after the exit light was amplified by the current voltage commutable amplifier(9).

The optical transmission loss is measured according to the following procedure.

The optical transmittable fiber(1) is cut to a length of lo and at right angles to the axis of the fiber. After finishing the planes smoothly and flatly, the plane of incidence(6) and the exit plane(7) are loaded and fixed on said unit for no movement during the measurement. The indicating value of voltmeter is read in a darkroom. The voltage value is set to (Io). Next, the room light is turned on, the exit plane(7) is removed from the unit, and the optical transmittable fiber(1)is cut off on the position(11) of the length(l) from this plane(7).

The plane of the optical transmittable fiber loaded on the unit is finished to the surface of the right angle to the axis of fiber as well as the beginning and loaded to the unit as a new exit plane. During these operations, it must be checked that the plane of incidence (6) for keeping constant the amount of incident light is fixed. Again in the darkroom, indicating values of voltmeter are read(I). The optical transmission loss is calculated by the following formula.

$$\alpha = \frac{10}{l} \log \frac{I}{Io} \ (dB/km)$$

Also, as for the flexibility, the obtained optical transmittable fiber was wound around a cylinder with a different external diameter and the radius(r) at which the cladding begins to become white was measured. The smaller the value(r), the better the flexibility.

EXAMPLE 1 OF PREPARATION

Preparation of Copolymer(A) of 4-methyl pentene-1

Titanium trichloride (10 millimole) and diethylaluminum monochloride (20 millimole), and additionally 1,660 g. of 4-methyl pentene-1 and 32 g. of octene-1 were part into a reaction vessel of 5 l, and was copolymerized at a temperature of 50° C. for two hours.

After the polymerization reaction, the product was separated from the solution by filtration, washed with a mixture of methanol and hydrochloride for decomposing the catalyst and dried to obtain copolymers.

As a result of analysis based on $^{13}$C-NMR of the product copolymer, poly-4-methyl pentene-1(P4MP1) containing 1.4 mole % of octene-1 units was observed The melting point(Tm) of this copolymer was 230° C. and the refractive index was 1.46. This copolymer is represented as copolymer P4MP1(A).

EXAMPLE 2 OF PREPARATION

Preparation of Copolymer(B) of 4-methyl pentene-1

A copolymer was obtained in the same way as in the preparation of copolymer (A) except that the amount of 1,660 g for 4-methyl pentene-1 was changed to 1,630 g and the amount of 32 g was changed to 70 g for octene-1.

As a result of analysis based on $^{13}$C-NMR a copolymer, P4MP1 containing 3.1 mole % of octene-1 unit was observed. The melting point(Tm) of this copolymer was 225° C. and the refractive index was 1.46. This copolymer is represented as copolymer P4MP1(B).

EXAMPLE 3 OF PREPARATION

Preparation of Copolymer(C) of 4-methyl pentene-1

A copolymer was obtained in the same way as in the preparation of copolymer (A) except that the amount of 1,660 g for 4-methyl pentene-1 was changed to 1,630 g and the amount of 32 g was changed to 112 g for octene-1.

As a result of analysis based on $^{13}$C-NMR, a copolymer, P-4MP1 containing 5.0 mole % of octene-1 units was observed. The melting point(Tm) of this copolymer was 220° C. and the refractive index was 1.46.

This copolymer is represented as copolymer P4MP1(C).

EXAMPLE 4 OF PREPARATION

Preparation of Copolymer(D) of 4-methyl pentene-1

A copolymer was obtained in the same way as in the preparation of copolymer (A) except that decene-1 (56 g) was used instead of octene-1 (32 g) and the amount of 1,660 g for 4-methyl pentene-1 was changed to 1,650 g.

As a result of analysis based on $^{13}$C-NMR, a copolymer, P4MP1, containing 2.0 mole % of decene-1 units was observed. The melting point(Tm) of this copolymer was 225° C. and the refractive index was 1.46. This copolymer is represented as copolymer P4MP1(D).

EXAMPLE 5 OF PREPARATION

Preparation of Copolymer(E) of 4-methyl pentene-1

A copolymer was obtained in the same way as in the preparation of copolymer (A) except that hexene-1 (101 g) was used instead of octene-1 (32 g) and the amount of 1,660 g pentene-1 was changed to 1,580 g for 4-methyl.

As a result of analysis based on $^{13}$C-NMR, a copolymer, P4MP1 containing 6.0 mole % of hexene-1 units was observed. The melting point(Tm) of this copolymer was 220° C. and the refractive index was 1.46. This copolymer is represented as copolymer P4MP1(E).

COMPARISON 1 OF PREPARATION

Preparation of Polymer(F) of 4-methyl pentene-1

Titanium trichloride (10 millimole) and diethylaluminum monochloride (20 millimole), and additionally 1,680 g of 4-methyl pentene-1 were put into a reaction vessel of 5 l, and polymerized at temperature of 50° C. for two hours.

After the polymerization reaction, the product was separated from the solution by filtration, washed with a mixture of methanol and hydrochloride for decomposing the catalyst and dried to obtain polymers. The melting point(Tm) of this polymer was 235° C. and the refractive index was 1.46. This polymer is represented as homo-P4MP1(F).

EXAMPLE 1 (EMBODIMENT)

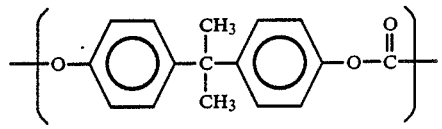

Employing a polycarbonate(Refractive index 1,585 Tg 148° C.) with the above represented repetition unit derived from bisphenol A as the polymer for the core and the copolymer, P4MP1(A) obtained in Example 1 of Preparation as the polymer for the cladding, the polymers were supplied to the spinning head of a combined spinning machine having nozzles of 3 mm in diameter by a screw molten extruder arranged at resin temperatures of 260° C. and 310° C., respectively. In addition, after extruding the product from the nozzles and cooling it for solidification, the product was pulled out at a speed of 20 m/min. Consequently, a plastic optical transmittable fiber with a core of 980 μm in diameter and a layer of cladding of 10 μm in thickness was obtained.

The optical transmission loss of the optical transmittable fiber was measured by using the optical wavelength of 660 nm and the flexibility was measured by the above mentioned method.

Table 1 shows the results.

EXAMPLE 2 (EMBODIMENT)

Except that the copolymer, P4MP1(B) obtained in Example 2 of Preparation was used instead of copolymer, P4MP1(A), in Example 1, a plastic optical transmittable fiber was formed and the optical transmission loss and the flexibility were measured in before as in Example 1.

Table 1 shows the results.

EXAMPLE 3 (EMBODIMENT)

Except that the copolymer, P4MP1(C), obtained in Example 3 of Preparation was used instead of copolymer, P4MP1(A), in Example 1, a plastic optical transmittable fiber was formed and the optical transmission loss and the flexibility were measured as in Example 1.

Table 1 shows the results.

EXAMPLE 4 (EMBODIMENT)

Except that the copolymer, P4MP1(D), obtained in Example 4 of Preparation was used instead of copolymer, P4MP1(A), in Example 1, a plastic optical transmittable fiber was formed and the optical transmission loss and the flexibility were measured as in Example 1.

Table 1 shows the results.

EXAMPLE 5 (EMBODIMENT)

Except that the copolymer, P4MP1(E), obtained in Example 5 of Preparation was used instead of copolymer, P4MP1(A), in Example 1, a plastic optical transmittable fiber was formed and the optical transmission loss and the flexibility were measured as in Example 1.

Table 1 shows the results.

COMPARISON 1

Except that the copolymer, P4MP1(F), obtained in Comparison 1 of Preparation was used instead of copolymer, P4MP1(A), in Example 1, a plastic optical transmittable fiber was formed and the optical transmission loss and the flexibility were measured as in Example 1.

Table 1 shows the results.

TABLE 1

| | | Polymer for clad material | | Optical transmission loss (dB/m) | Flexibility (mm) |
|---|---|---|---|---|---|
| Example | 1 | P4MP1 | (A) | 1.9 | 7 |
| Example | 2 | P4MP1 | (B) | 0.9 | less than 1 |
| Example | 3 | P4MP1 | (C) | 0.85 | less than 1 |
| Example | 4 | P4MP1 | (D) | 1.5 | 3 |
| Example | 5 | P4MP1 | (E) | 1.2 | 5 |
| Comparison | 1 | HomoP4MP1 | (F) | 3.3 | 20 |

What is claimed is:

1. A plastic optical transmittable fiber comprising a core and a cladding, the cladding comprising a copolymer containing 70 to 99.5 mole % of 4-methyl pentene-1 units and 30 to 0.5 mole % of units of an α-olefin of 2 to 24 carbon atoms, and a polycarbonate core material having a refractive index higher than that of the cladding by at least 0.01.

2. A plastic optical transmittable fiber according to claim 1, wherein the α-olefin is selected from the group consisting of hexene-1, octene-1 and decene-1.

3. A plastic optical transmittable fiber according to claim 1, wherein said copolymer is prepared by slurry polymerization of the 4-methyl pentene-1 and the α-olefin at a temperature of 20 to 100° C. in the presence of a polymerization catalyst.

4. A plastic optical transmittable fiber according to claim 3, wherein said polymerization catalyst comprises a titanium compound and an organoaluminum compound.

5. A plastic optical transmittable fiber according to claim 4, wherein said polymerization catalyst comprises titanium trichloride and diethylaluminum chloride.

6. A plastic optical transmittable fiber according to claim 1, wherein said core is a bisphenol A polycarbonate.

* * * * *